US011075529B2

(12) United States Patent
Miller et al.

(10) Patent No.: US 11,075,529 B2
(45) Date of Patent: Jul. 27, 2021

(54) DECORATIVE PORTABLE POWER CHARGER

(71) Applicant: Halo International Sezc Ltd., Grand Cayman (KY)

(72) Inventors: Garold C. Miller, Hartford, CT (US); Nathan Daniel Weinstein, Hartford, CT (US)

(73) Assignee: HALO INTERNATIONAL SEZC LTD., Georgetown (KY)

( * ) Notice: Subject to any disclaimer, the term of this patent is extended or adjusted under 35 U.S.C. 154(b) by 0 days.

(21) Appl. No.: 16/448,175

(22) Filed: Jun. 21, 2019

(65) Prior Publication Data

US 2019/0305569 A1 Oct. 3, 2019

Related U.S. Application Data

(63) Continuation of application No. 15/486,368, filed on Apr. 13, 2017, now Pat. No. 10,483,774, which is a
(Continued)

(51) Int. Cl.
*H02J 7/00* (2006.01)
*H02H 11/00* (2006.01)
(Continued)

(52) U.S. Cl.
CPC ......... *H02J 7/0042* (2013.01); *A45C 13/001* (2013.01); *A45C 13/08* (2013.01);
(Continued)

(58) Field of Classification Search
CPC ...... H02J 7/0044; H02J 7/0052; H02J 7/0045; H02J 7/0042; A45C 13/001; A45C 13/08; A45F 5/00; A45F 5/02; A45F 5/021
(Continued)

(56) References Cited

U.S. PATENT DOCUMENTS 1,413,618 A 4/1922 Rosenblum
1,896,060 A 1/1933 Colby
(Continued)

OTHER PUBLICATIONS

Erica, DIY Tassel Tote, 2015, <https://honestlywtf.com/diy/diy-tassel-tote/> (Year: 2015).*
(Continued)

*Primary Examiner* — Zixuan Zhou
(74) *Attorney, Agent, or Firm* — Lathrop GPM LLP

(57) ABSTRACT

A compact, decorative and multi-functional portable power charger and cable apparatus includes a portable charger unit with a housing where the housing encloses an internal rechargeable battery unit for connecting to and recharging one or more electronic devices, and a charging cable extending from the charger housing and in operative communication with the rechargeable battery. At least the charger housing is surrounded by an aesthetic feature, which can comprise a tasseled fitting, a puffball, a luggage tag, or a doll or teddy bear to hide the charger unit. Electrical fittings including power connection interfaces for connecting the charger and cable apparatus with at least one electronic device, or an external power source, or both, can be provided on the charging cable and also hidden by the aesthetic feature. The power charger and cable apparatus can be attached to a fashion accessory, such as a purse, a bag, luggage or clothing.

14 Claims, 10 Drawing Sheets

Related U.S. Application Data continuation-in-part of application No. 14/978,128, filed on Dec. 22, 2015, now Pat. No. 9,954,380.

(60) Provisional application No. 62/112,934, filed on Feb. 6, 2015.

(51) Int. Cl.
| | |
|---|---|
| *A45F 5/00* | (2006.01) |
| *A45F 5/02* | (2006.01) |
| *H02H 3/18* | (2006.01) |
| *A45C 13/08* | (2006.01) |
| *A45C 13/00* | (2006.01) |
| *H02J 7/34* | (2006.01) |

(52) U.S. Cl.
CPC ............... *A45F 5/00* (2013.01); *A45F 5/02* (2013.01); *A45F 5/021* (2013.01); *H02H 3/18* (2013.01); *H02H 11/003* (2013.01); *A45F 2005/006* (2013.01); *A45F 2005/008* (2013.01); *H02J 7/342* (2020.01)

(58) Field of Classification Search
USPC .................................................. 320/103, 107
See application file for complete search history.

(56) References Cited

U.S. PATENT DOCUMENTS

| | | |
|---|---|---|
| 2,107,459 A | 2/1938 | Weller |
| 2,762,056 A | 9/1956 | Glagovsky |
| 3,105,243 A | 10/1963 | Kampfe et al. |
| D429,281 S | 8/2000 | Miller et al. |
| 6,637,909 B1 * | 10/2003 | Bryan .................... A45C 15/00 |
| | | 362/154 |
| D683,991 S | 6/2013 | Smith |
| D716,052 S | 10/2014 | Sappenfield-Chan |
| D730,637 S | 6/2015 | Maddocks |
| 2012/0289080 A1 | 11/2012 | Huang et al. |
| 2013/0043827 A1 * | 2/2013 | Weinstein ............. H02J 7/0027 |
| | | 320/103 |
| 2014/0159639 A1 | 6/2014 | Miller |
| 2015/0201708 A1 | 7/2015 | Maddocks |
| 2015/0270728 A1 * | 9/2015 | Williams ............. H02J 7/0044 |
| | | 320/111 |

OTHER PUBLICATIONS

Joe Rossignol, "Belkin Launches MIXIT Lightning to USB Keychain Chargers", 2015, Macrumors, <https://www.macrumors.com/2015/08/27/belkin-mixit-lightning-to-usb-cables/> (Year: 2015).*

Michael Zhang, This Stylish Leather Tassel is Actually a USB Charging Cable in Disguise, Sep. 12, 2014, <https://petapixel.com/2014/09/12/stylish-leather-tassel-actually-usb-charging-cable-disguise/>, pp. 1-4.

* cited by examiner

DECORATIVE PORTABLE POWER CHARGER

CROSS-REFERENCE TO RELATED APPLICATIONS

This application is a continuation of U.S. patent application Ser. No. 15/486,368, filed Apr. 13, 2017, which is a continuation-in-part of U.S. application Ser. No. 14/978,128, filed Dec. 22, 2015, which claims priority to U.S. Provisional Application No. 62/112,934, filed Feb. 6, 2015, each of which is hereby incorporated by reference in its entirety.

FIELD OF INVENTION

The present invention generally relates to fashion accessories and power chargers for charging portable electronic devices, and more particularly to a decorative portable power charger and cable apparatus that can be combined with and used as a personalized fashion accessory having multiple features that improve upon its use and functionality.

BACKGROUND OF THE INVENTION

Portable battery-powered electronic devices, such as mobile cellular phones, smart phones, portable music players including, an iPod® or an MP3 player, a tablet, a portable gaming unit, and the like can run out of battery charge during use of the device, or while the device is being carried around. These devices require recharging to regain or maintain their operating condition. Such electronic devices typically utilize a cable for connecting the device to a power source, such as a wall outlet, a car charger, an airplane charger, or a computer to recharge. However, many times, such a power source is not readily available or close by and the electronic device has insufficient charge remaining before the user can get to a power source to connect the device. Moreover, even when the device is connected to an external power source for recharging, it is difficult to continue using the device, as the device needs to remain tethered to the power source.

Similarly, a separate charging cable is usually required for connecting an electronic device with a particular power source. For example, a consumer will have one cable for charging a phone at home with an AC wall socket, and another cable for charging the phone in the car using the DC car charging socket, and perhaps additional cables for charging the phone using a computer or on an airplane. Moreover, different electronic devices often utilize different connection ports and interfaces such that a single charging cable is not compatible with multiple devices. Accordingly, a tech-savvy consumer with several electronic devices will usually have multiple charging cables to keep track of. Even then, the consumer may not always be in a place where a power source is readily available, for example, if they are at the park, or may not have the appropriate cable or adapter available to use with a particular power source, for example, if they are in the office but left their charging cable at home, or may be without sufficient power to recharge a phone or other device due to bad weather or a power outage.

On occasion, an electronic device needs a small amount of charge to finish a task before the device powers down due to insufficient battery capacity. For example, a user on a call using a mobile phone may wish to finish the call, but cannot find a power source to plug into, may not have enough time to get to a power source, or may not have the appropriate charging cable at the time. As noted, if the phone is plugged into a traditional power source, like a wall socket, it is difficult to continue using the phone as desired. Accordingly, what is needed is a power charger and cable apparatus, even with a small boost of power, that is as portable as the electronic device and preferably easy to carry with the electronic device, and thus easily usable on-the-go.

Further, even portable power chargers often use up valuable storage space, such as in a bag or a purse, adding an additional burden that a consumer needs to carry around. For example, a consumer may need to carry and keep track of multiple electronic devices and associated charging cables along with a wallet, keys, perhaps make-up, and various other objects, such that adding a portable power charger may simply added to the load.

Still further, portable power chargers designed for use on-the-go must be suitable to a variety of conditions, as they are often most in need where a standard external power source is not available, and, thus, often needed where there is no power at all. For example, a portable power charger is especially useful when walking, camping, at the park, at the mall, or at a sporting event, where one may need to use a phone in an emergency situation. On occasion, it may be dark when the charger is needed, and, thus, there is insufficient ambient light to assist in use of the charger or the electronic device needing a power boost. Accordingly, there is a need for a portable charger with the versatility of providing a light to assist use of the power charger to connect to an electronic device needing a charge, or simply as a flashlight to help the user in a time of need even where the power charger is not yet needed.

Still further, standard portable chargers and their associated charging cables are unsightly and users typically want to have them hidden or out of sight, or just left at home.

Accordingly, there is a need for a fashionable and functional accessory to recharge various portable electronic devices that can be easily transported, stored and used that also helps to reduce the load and congestion in the bag or purse. Thus, the charger and cable apparatus does not take up additional space in the bag or purse, can provide multiple functions, and is readily accessible whenever needed, especially for that small boost of power to continue an activity on an electronic device in a time of need. Additionally, it is a general object of the present invention to provide a decorative power charger and cable apparatus that improves upon conventional chargers on the market and overcomes the problems and drawbacks associated with such prior art charger cables and power chargers.

SUMMARY OF THE INVENTION

In accordance with the present invention, a compact, decorative and multi-functional portable charger and cable apparatus is provided for charging an electronic device on-the-go. In general, a portable charger and cable apparatus comprises a portable charger unit including a housing, having an internal rechargeable battery unit disposed therein for connecting to and recharging one or more electronic devices, as necessary. The charger also includes a charging cable connected to the housing and in operative communication with the internal battery therein said cable including electrical fittings such as at least one power connection male interface for connecting the charger and cable apparatus with at least one electronic device, or an external power source, or both.

In accordance with a first aspect of the present invention, at least the charger housing is hidden by an aesthetic element. Preferably, the aesthetic element surrounds the charger housing to hide it from view when not in use so that the charger can appear as a fashion accessory. In alternate embodiments, the charging cable can also be hidden by the aesthetic element when not in use. When the charger is needed to connect to an electronic device in need of a recharge, the charging cable can be pulled from the aesthetic element to connect to the electronic device. In accordance with the present invention, the aesthetic element can include one or more tassels, puffballs, luggage tags, dolls, teddy bears and/or any combination thereof.

In another aspect of the present invention, the charger includes a flashlight portion including a light emitting diode (LED) for projecting light from the charger housing.

In an embodiment of the charger of the present invention, the charger housing includes a charging cable extending therefrom with a male power connection interface for connecting the charger to an electronic device in need of a charge. The distal end of the charging cable can alternately be equipped with multiple male power connection interfaces, such as with a 2-in-1 cable or a squid cable. In embodiments, one end of the cable comprises a standard USB connector interface, while the other end comprises an Apple Lightning and/or a micro-USB connector interface. Any known male connector interface may be used without departing from the spirit and principles of the present invention. Additionally or alternately, one or both ends of the cable can be adapted to interact with modular and interchangeable adapter tips so that the connection interfaces can be changed or adapted to work with connection ports of varying design so as to be usable with many types of portable electronic devices.

In another embodiment of the charger of the present invention, a two-ended cable may be provided, for example, one end of the cable acting as a power input for recharging the internal battery of the charger when that end of the cable is connected to an external power source, and an opposing end of the cable acting as a power output for recharging electronic devices from the charger when that opposing end is connected to such electronic devices. In an embodiment of this type of charger, the charging cable can be divided into a first cable portion and a second cable portion, each said cable portion being connected to and extending outwardly from the charger housing. The housing can be adapted to accommodate an entire charging cable, portions thereof, or said first and second cable portions, as described, or storage when not in use, such as, for example, within storage cavities via flexing or pivoting the cable/cable portions, or within the charger housing via retraction means.

In another aspect of the present invention, an attachment mechanism is provided for attaching the charger and cable apparatus to a purse, bag, wristlet, wallet, luggage, or clothing. For example, a carabineer, clip, strap, magnets or the like can be used to attach the charger in this fashion so that the charger is readily accessible but appears as an aesthetic fashion accessory and not a power charger or charging cable. Further, the charger and cable apparatus can be worn around a user's wrist. Any of the modes of attachment obviates the problem of a user forgetting or misplacing the apparatus.

Alternatively, the charger and cable apparatus can be used as a stand-alone accessory. For example, when needed for use, the charger and cable apparatus can be detached from the bag or clothing for use, for example by disengaging a clip or magnet means used to attach the apparatus for transport and/or storage.

These and other objects, features and advantages of the present invention will become apparent in light of the detailed description of embodiments thereof, as illustrated in the accompanying drawings.

DETAILED DESCRIPTION OF PREFERRED EMBODIMENTS

Figure 1:
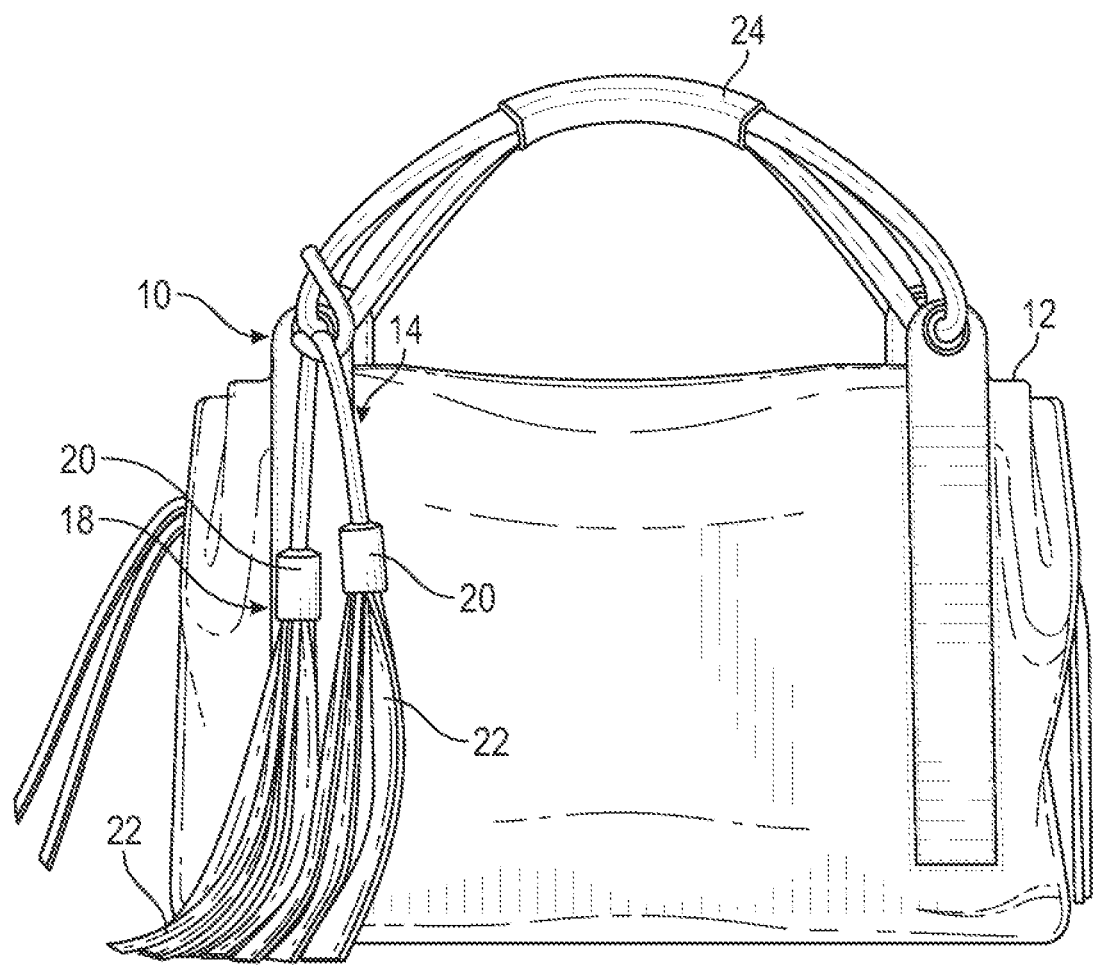
FIG. 1 illustrates a power charger and cable apparatus according to an embodiment of the present invention with two tasseled ends attached to a fashion accessory.

The present invention is generally directed to a portable power charger and cable apparatus 10 provides a means for attaching a portable power charger to a fashion accessory 12, such as a handbag, luggage, clothing or the like, and essentially making the portable power charger an aesthetic fashion accessory itself. Referring to FIG. 1, in accordance with an embodiment of the present invention, the power charger and cable apparatus 10 includes a cable 14 that has tasseled fittings 18 mounted on each end thereof so that the apparatus 10 looks to the public like a fashion accessory on the user's purse 12.

Figure 2:
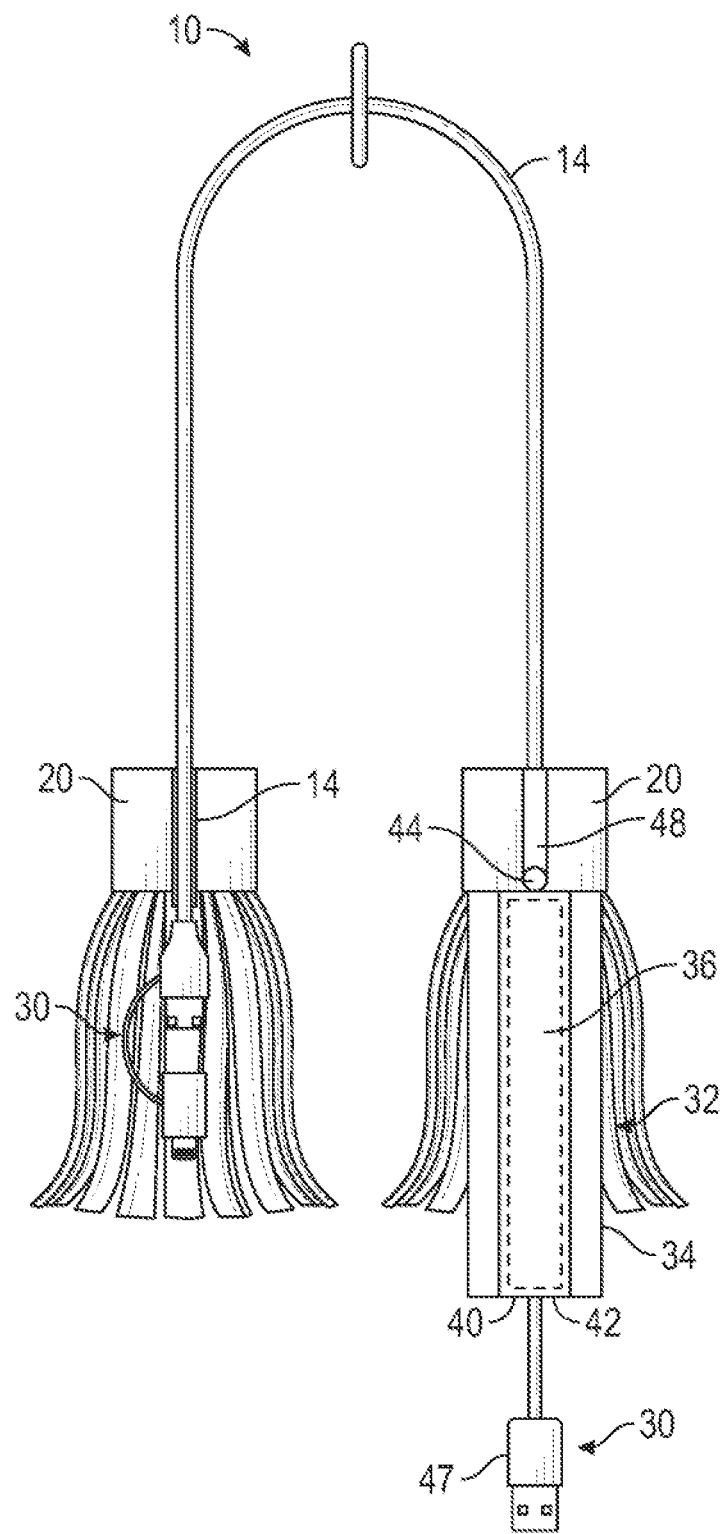
FIG. 2 shows a partial cutaway view of the apparatus of FIG. 1 without tasseled ends.

The cable 14 includes a first end and a second end, illustrated in a partial cut-away view in FIG. 2, with an electrical fitting, such as a power connection interface, provided on each of said ends. Each tasseled fitting 18 is designed to hide the portable power charger, and preferably the electrical fittings as well (at least when not in use). Accordingly, a tasseled fitting 18, as shown, may comprise a cap 20 as well as tassel strips 22 made of leather, fabric or plastic in a variety of colors, textures, patterns, and sizes to create and aesthetic fashion element. Alternatively, the fittings 18 may be provided only with the tassel strips 22, with the caps 20 being optional.

Figure 4:
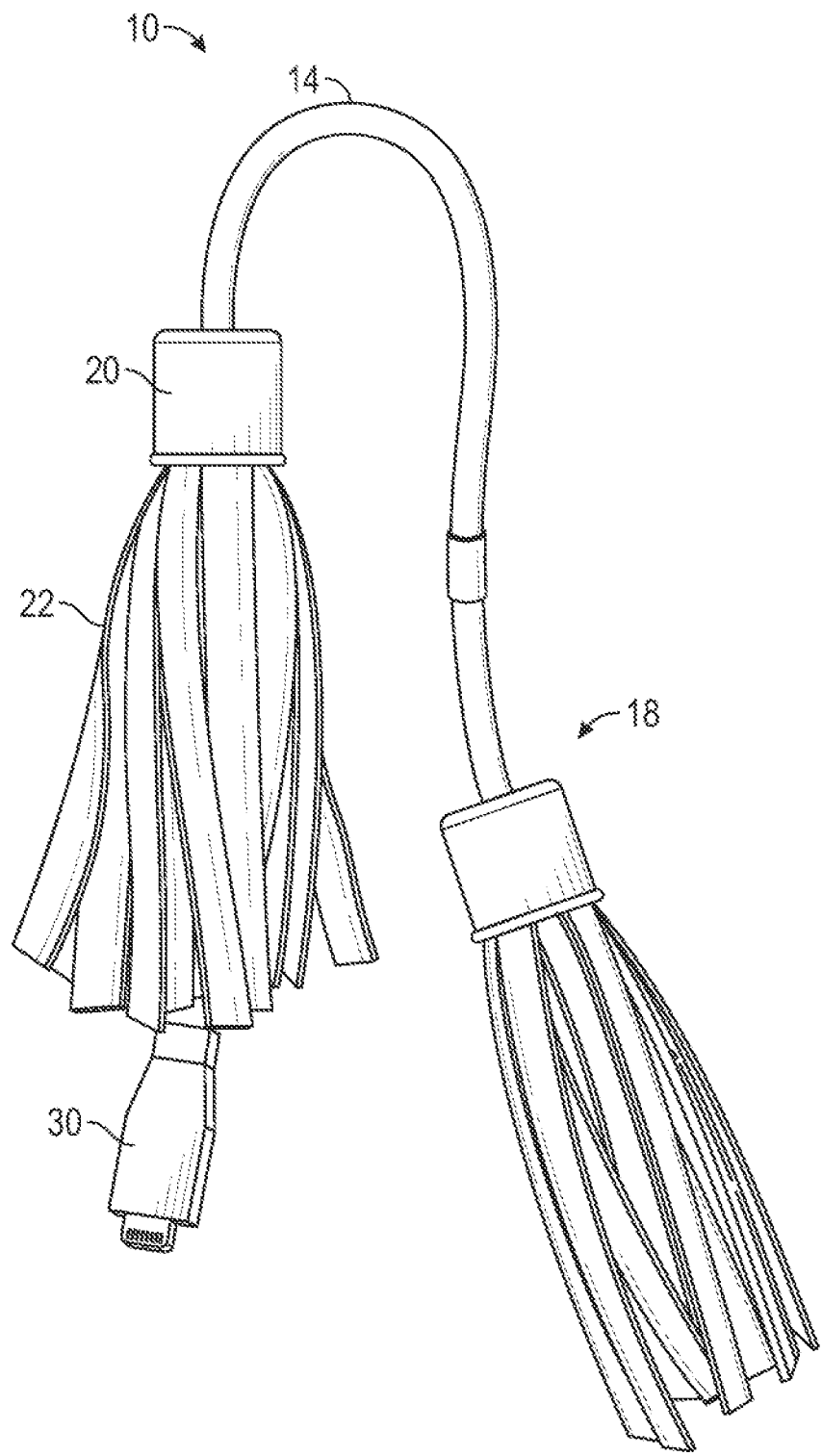
FIG. 4 shows another configuration of the apparatus of FIG. 1 with tasseled ends.
Figure 5:
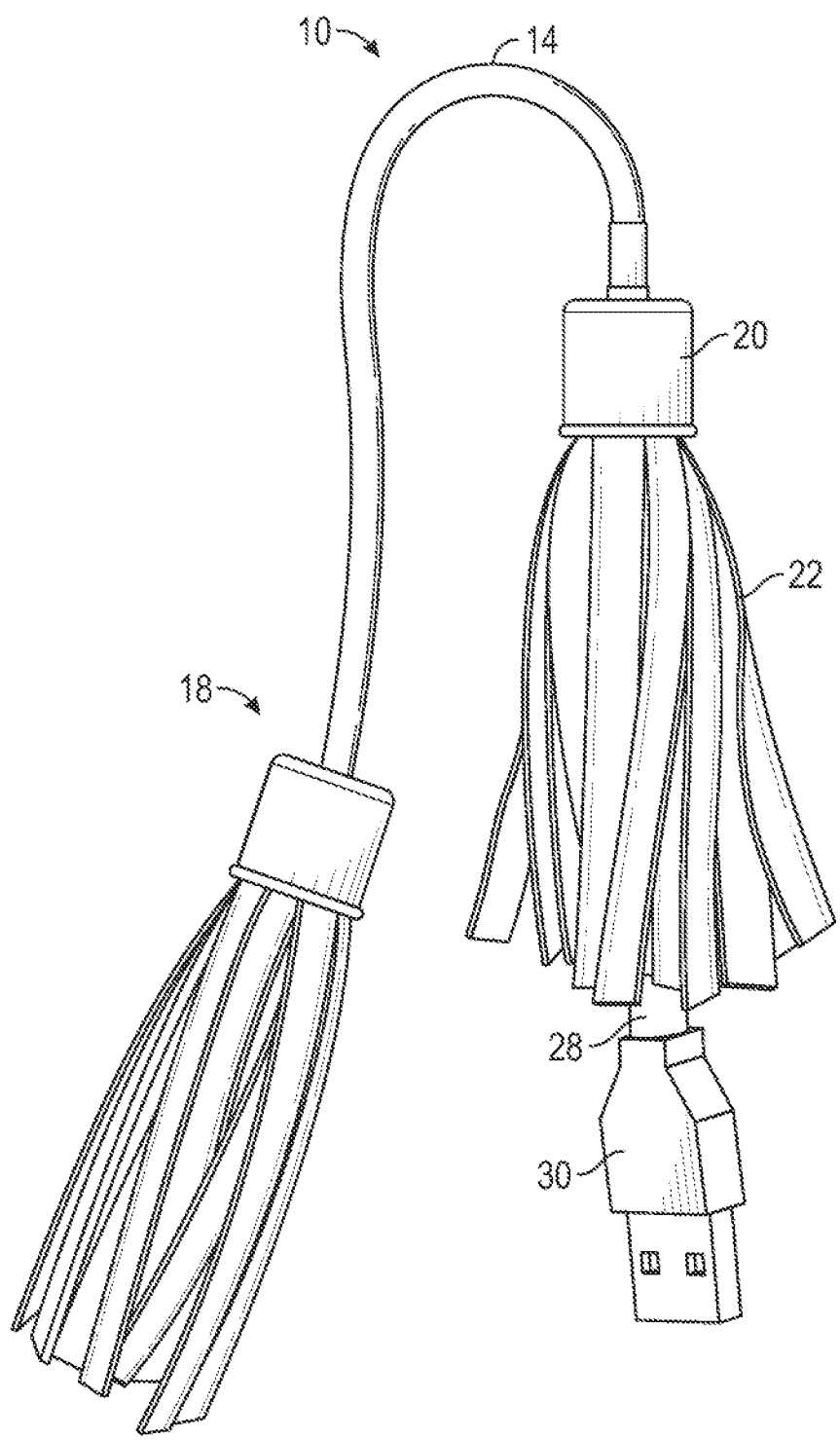
FIG. 5 shows yet another configuration of the apparatus of FIG. 1 with tasseled ends.

Referring to FIGS. 4 and 5, the illustrated embodiment includes sliding caps 20. That is, the caps 20 can be slid along the cable 14 to expose portions of the portable power charger 32 and/or the electrical fittings 30 for use. By sliding the caps 20 and exposing at least the power connection interfaces of the electrical fittings 30, the charger device 32 can be connected to electronic devices in need of a recharge from a rechargeable battery internally disposed in the charger 32, or an external power source in order to recharge the internal battery of the charger 32 itself. As noted and shown, when the charger 32 is not in use, it can be hidden by the aesthetic component of the tasseled fittings 18, and when attached to a purse 12, as shown in FIG. 1, people may not be aware that the apparatus 10 is anything but a tasseled accessory added to the purse 12 as a decoration.

The cable 14 can be covered with a decorative sleeve that can be stitched or braided leather, fabric or plastic, much like the materials of the tassel strips 22 with an attractive appearance, complementary to the fashion accessory 12. The tassels 22 may be of the same material, color and general design as the decorative sleeve, or differing material, color or general design. The caps 20 may be fabricated of metal, wood, or plastic, or of the same material as the decorative sleeve. The caps 20 further include a ring 23 which can be fabricated from, for example, metal, for providing a cylindrical distribution and appearance of the tasseled fittings 18.

Figure 3:
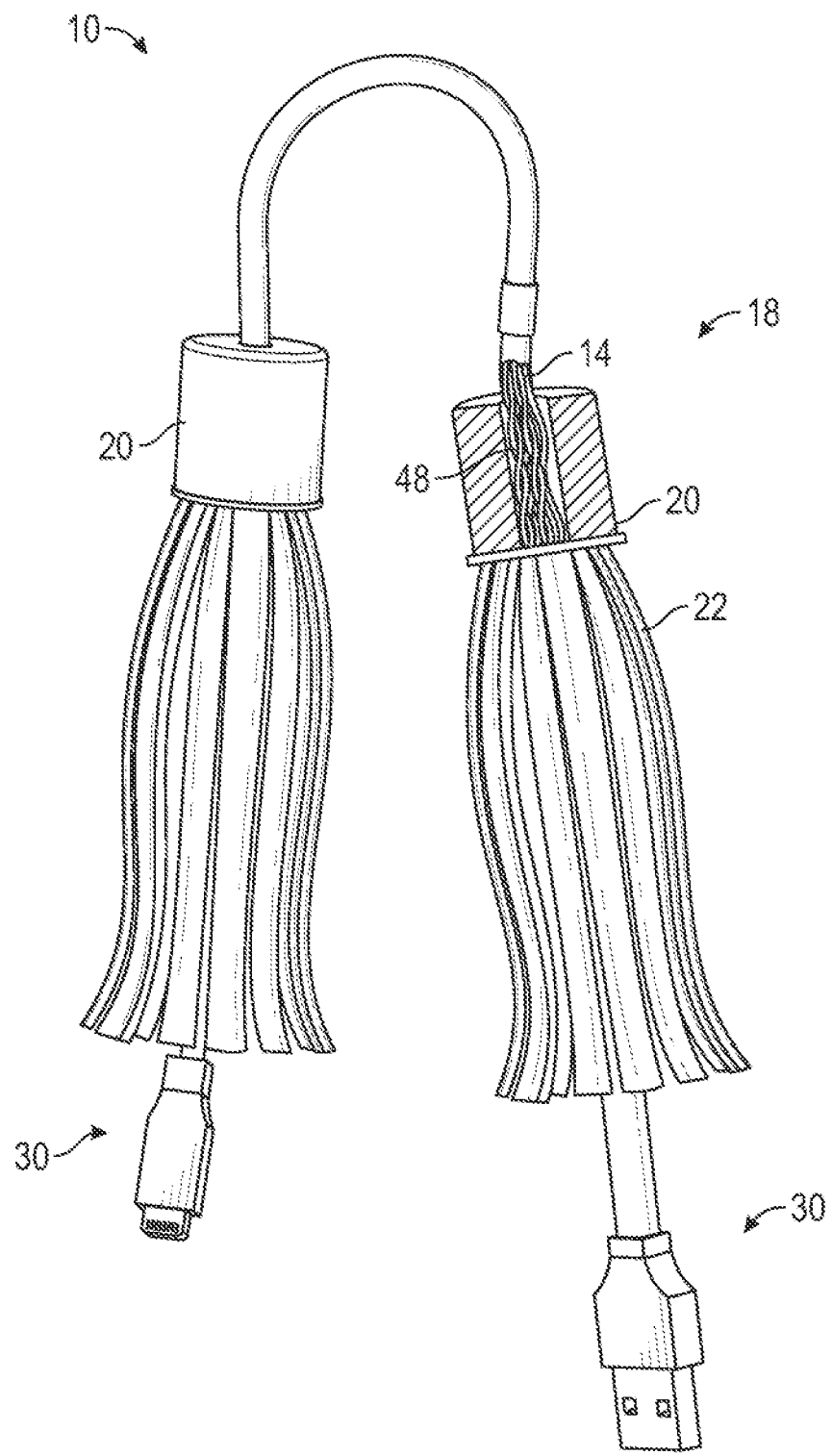
FIG. 3 shows a partial cutaway view of a configuration of the apparatus of FIG. 1 with tasseled ends.
Figure 6:
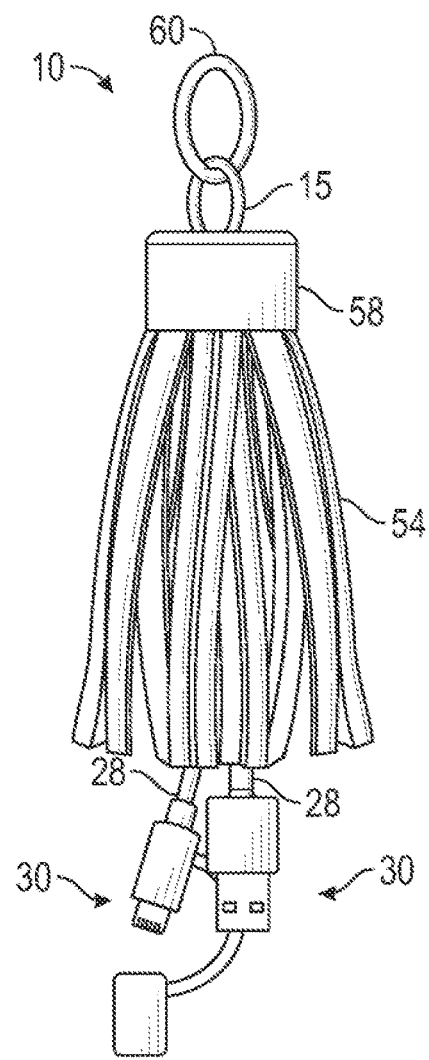
FIG. 6 shows a power charger and cable apparatus with a single tassel according to another embodiment of the present invention.
Figure 7:
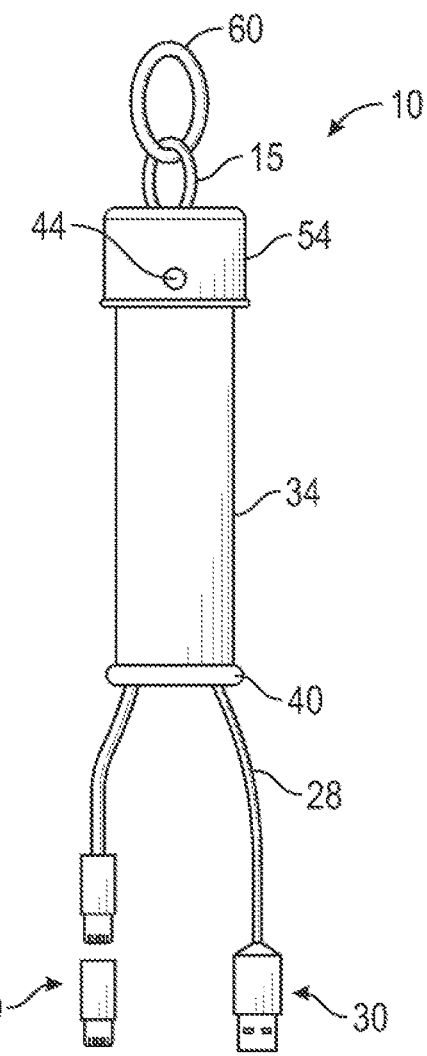
FIG. 7 shows a configuration of the apparatus of FIG. 6 without the tassel.

In FIG. 1, the power charger and cable apparatus 10 is shown as being looped around a handle 24 of the fashion accessory 12. However, the power charger and cable apparatus 10 equally can be looped through a zipper pull or a belt loop, wrapped around a user's wrist, tied around a backpack strap, or the like, or connected by known attachment means, including but not limited to via a clip, carabineer, strap, hook-and-loop fasteners, magnets, or the like. In FIG. 1, a loop is shown to attach the apparatus 10 to a purse 12. In FIGS. 3-5, a magnetic connector is provided for attaching the cable 14 to itself after it is looped around something, such as a purse strap. In FIGS. 6-7, a carabineer is provided to attach the apparatus 10 to a fashion accessory.

Referring to FIG. 2, which provides a partial cutaway view of the power charger and cable apparatus 10 without tassels 22, the charger cable 14 has electrical fittings 30 at each end thereof. As shown, the cable 14 essentially passes through a charger unit 32. However, the cable 14 need not be constructed of a single cable. Instead, as shown, the cable 14 can comprise a first cable portion and a second cable portion, each connected to and extending away from a charger housing 34. One of the cable portions can act as a power input for recharging the internal battery of the charger 32 when that end of the cable 14 is connected to an external power source. The other of the cable portions can act as a power output for recharging electronic devices from the charger 32 when that opposing end is connected to such electronic devices. For illustration purposes in FIG. 2, the left side of the cable acts as a power output, while the right side (closer to the charger unit 32) acts as a power input.

The electrical fittings 30 may be male power connection interfaces such as USB or micro-USB, Apple Lightning or 30-pin, DC plug, or the like. Alternatively, one of the electrical fittings 30 may be a 2-in-1 connection or a "squid" fitting that provides more than one type of connection interface. As shown in FIG. 2, the power output portion of the cable 14, includes a 2-in-1 connection, with two male connection interfaces, in accordance with designs known in the art. Also, either or both of the electrical fittings 30 may include a female power connection interface, e.g., a female USB port or a female DC port/socket. Still further, one or both ends can be adapted to interact with modular and interchangeable adapter tips so that the connection interfaces can be changed or adapted to work with connection ports of varying designs so as to be usable with many types of portable electronic devices, power sources, or adaptors.

As noted, the portable power charger and cable apparatus 10 in accordance with the present invention includes a charger unit 32 comprising a charger housing 34 having a rechargeable internal battery 36 disposed therein for recharging one or more electronic devices via at least one electrical fitting 30. The cable 14 is in operative communication with the internal battery 36 such that a charge from the internal battery 36 can be provided to an electronic device connected to the charger and cable apparatus 10 via an electrical fitting 30. Similarly, a charge can be provided to the internal battery 36 from an external power source (not shown) when an electrical fitting 30 of the apparatus 10 is connected to such an external power source. In this regard, the charger unit 32 is operatively connected to, and generally forms a segment of, the charger cable 14.

In accordance with an aspect of the present invention, the portable power charger and cable apparatus 10 also may include a flashlight feature 40, generally comprising a light emitting diode (LED) 42 for projecting light from the charger housing 34. The flashlight feature 40 is in operative communication with the internal battery 36 for operation. A manual power button 44, shown in FIG. 7, can be provided to operate the flashlight feature 40. The inclusion of such a flashlight feature 40 improves the functionality of the portable power charger and cable apparatus 10, and allows it to be used as both a charger and a light, all packaged together in an aesthetic design that is readily accessible to the user by way of its connection to the outside of a purse, luggage or clothing.

The charger unit 32 may have a variety of designs, including the embodiments discussed and illustrated herein, and may be provided with connector cables, connection interfaces and adapters suitable for recharging the internal battery 36 of the charger unit 32 and recharging the batteries of various electronic devices connected thereto.

In preferred embodiments, the rechargeable internal battery 36 has an approximately 3000 mAH storage capacity for providing hours of electrical charge to the batteries of various electronic devices connected thereto.

The at least one electrical fitting 30 extending from the portable charger housing 34 further includes an LED power indicator 47 capable of illuminating green, yellow and red to indicate the amount of charge available from the internal battery 36 of the charger unit 32. Alternate power indicator means could be used without departing from the spirit and principles of the present invention.

Referring to FIG. 3, each of the caps 20 may house a slide tube 48, which slidingly attaches to the charger cable 14 so that the tasseled fittings 18 may be movable along the charger cable 14 to different positions for concealing or for revealing the electrical fittings 30. In general, the tasseled fittings 18 can be slid to a rest position at the ends of the cable 14, as shown in FIG. 1, to hide the charger unit 32 and the electrical fittings 30 when not in use. When the charging capacity of the apparatus 10 is needed, either of the tasseled fittings 18 can be slid along the cable 14 to expose the electrical fittings 30, as shown in FIGS. 3-5, so that the charger 32 can be connected to an electronic device in need of a charge.

In preferred embodiments, the electrical fittings 30 are male connectors operatively connected to the internal battery 36 of the charger unit 32 and capable of operating as either a power input or a power output, or both. For example, when acting as a power output, either of the male connectors 30 supplies a standard charging power profile, such as the approximately 3000 mAH. When acting as a power input one or both of the male connectors 30 supply an electrical charge to the battery 36 from an external power source for recharging the internal battery unit 36.

In concealing positions, the caps 20 would rest against or near the male connectors 30 and/or charger unit 32 while the tassels 22 hang over the male connectors 30. In revealing positions, one or both of the caps 20 would be withdrawn from the male connectors 30 and/or charger unit 32 so that the tassels 22 do not hang over the male connectors 30.

Alternatively, one or both of the caps 20 may be fixedly attached to the charger cable 14, with the corresponding tassels 22 being moved aside or spread apart to reveal the electrical fittings 30 and with the tassels 22 being moved together to conceal the electrical fittings 30.

In alternate embodiments, the charger housing 34 could be provided with one or more female power connection port, operatively connected to the internal battery 36, and operable as either a power input or a power output, or both. Standard charging cables can be used with the connection port to increase the functionality of the portable power charger and cable apparatus 10, such as, for example, when the electrical fittings 30 provided with the apparatus 10 are already being used, or perhaps are not compatible with a certain electronic device.

FIGS. 6 and 7 illustrate an embodiment of the power charger and cable apparatus 10, in which two electrical fittings 30 extend from the charger housing 34 via charger cable portions 28 and a single large tassel 54 may collectively conceal the entire charger 32 and cable portions 28 and both of the electrical fittings 30. In this embodiment, tasseled fittings 18 are no longer mounted at the ends of a charging cable 14. Instead, a connector 15 provided at the top of the charger housing 34 is looped through and held in a large cap 58 at the top of the tasseled fitting 54. The large cap 58 connects the tasseled fitting 54 via the connector 15 to a carabineer or similar clip, hook, ring, zipper pull, strap or the like (designated as reference numeral 60) used for attaching the entire apparatus 10 to a fashion accessory, such as the purse illustrated in FIG. 1. In this manner, the power charger and cable apparatus 10 then can be hooked onto the handle 24 of the fashion accessory 12, a backpack strap, or the like by way of the carabineer 60.

The charger cables 28 can be adapted to retract within the charger housing 34 and extend away from the charger housing 34, for example, to extend one electrical fitting further out from the tassel 54 in order to facilitate connection with an electronic device or with a power source or both. Alternately, the charger housing 34 could be provided with storage cavities for receiving and storing the cable portions 28 when not in use. That is, when the charger 32 was needed for connection o an electronic device, or to an external power source for recharging, a cable portion could be removed from its storage cavity for connection to such an electronic device or external power source.

Additionally, the charger cables 28 may comprise an LED light up cable capable of illuminating green, yellow and red to indicate the amount of charge available from the internal battery 36 of the charger unit 32.

A depressible power button 44 disposed on the charger housing 34 shown in FIG. 7 manual toggles the flashlight portion 40 on and off.

The present invention may be used with a variety of aesthetic features for enclosing and effectively "hiding" the charger unit and charging cable in a decorative and functional manner. FIGS. 8-11 illustrate some of these alternate embodiments.

Figure 8:
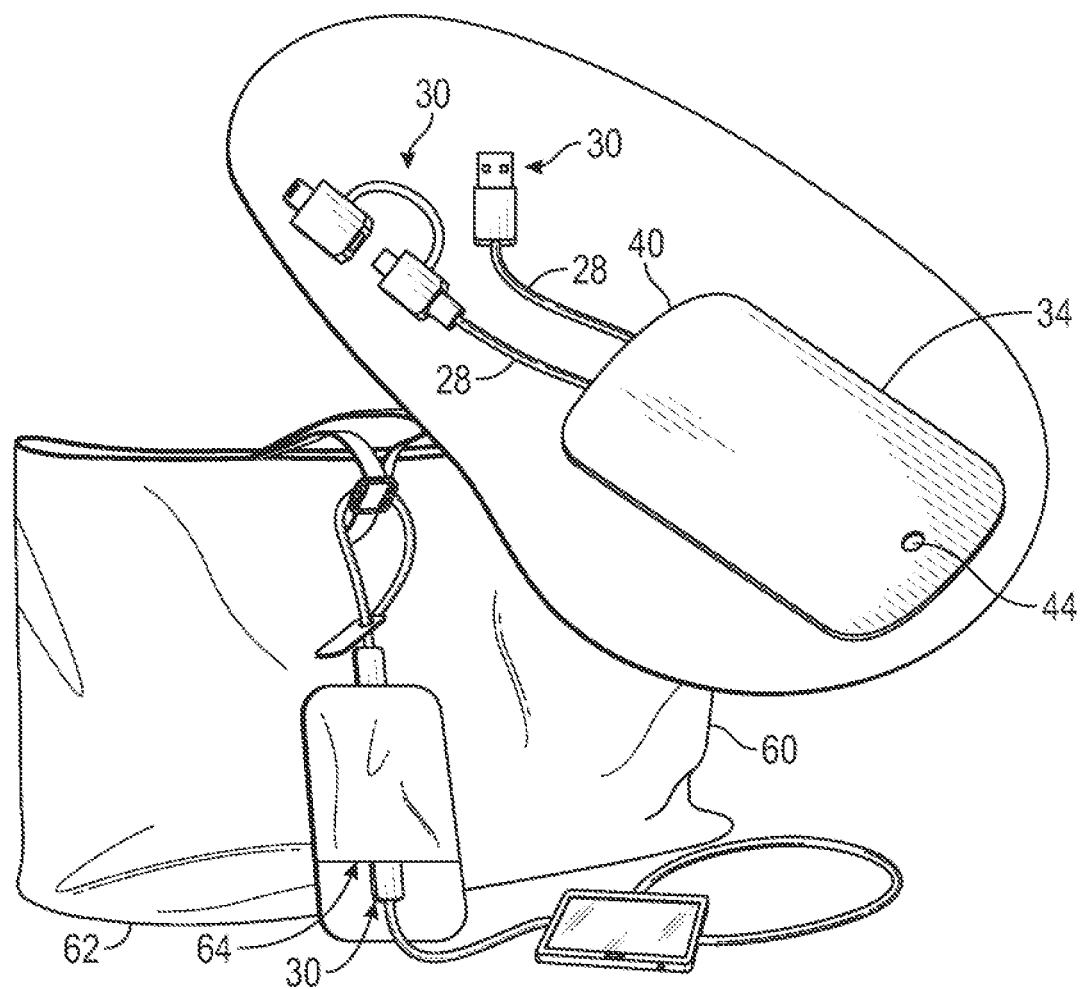
FIG. 8 shows a power charger and cable apparatus combined with a luggage tag according to another embodiment of the present invention.

FIG. 8 illustrates an embodiment of the power charger and cable apparatus 10, in which a luggage tag 62 encloses the charger housing 34 and cable portions 28 extending therefrom. The luggage tag 62 can be fabricated of leather, plastic or cloth, fashioned with a pocket 64 that closely fits around the charger housing 34, which preferably takes the shape of a flat business card sized object. The luggage tag 62 further includes a flap 65 for concealing and revealing the power charger and cable apparatus 10. The flap 65 is capable of enclosing the power charger and cable apparatus 10 within the luggage tag 62 by a snap, magnet, zipper or the like.

The charger housing 34 can be sized to fit within the luggage tag 62 having a generally flat appearance with at least two rounded edges. Further, a power button 44 is operatively connected to the rechargeable internal battery 36 and a flashlight portion 40, and is adapted to be depressed through the luggage tag 62. At least one of the electrical fittings 30 is visible and directly accessible through the pocket 64 when the flap 65 is in an open position. The luggage tag 62 also includes strap 60 for ease of carriage and attachment to the fashion accessory 12.

Figure 9:
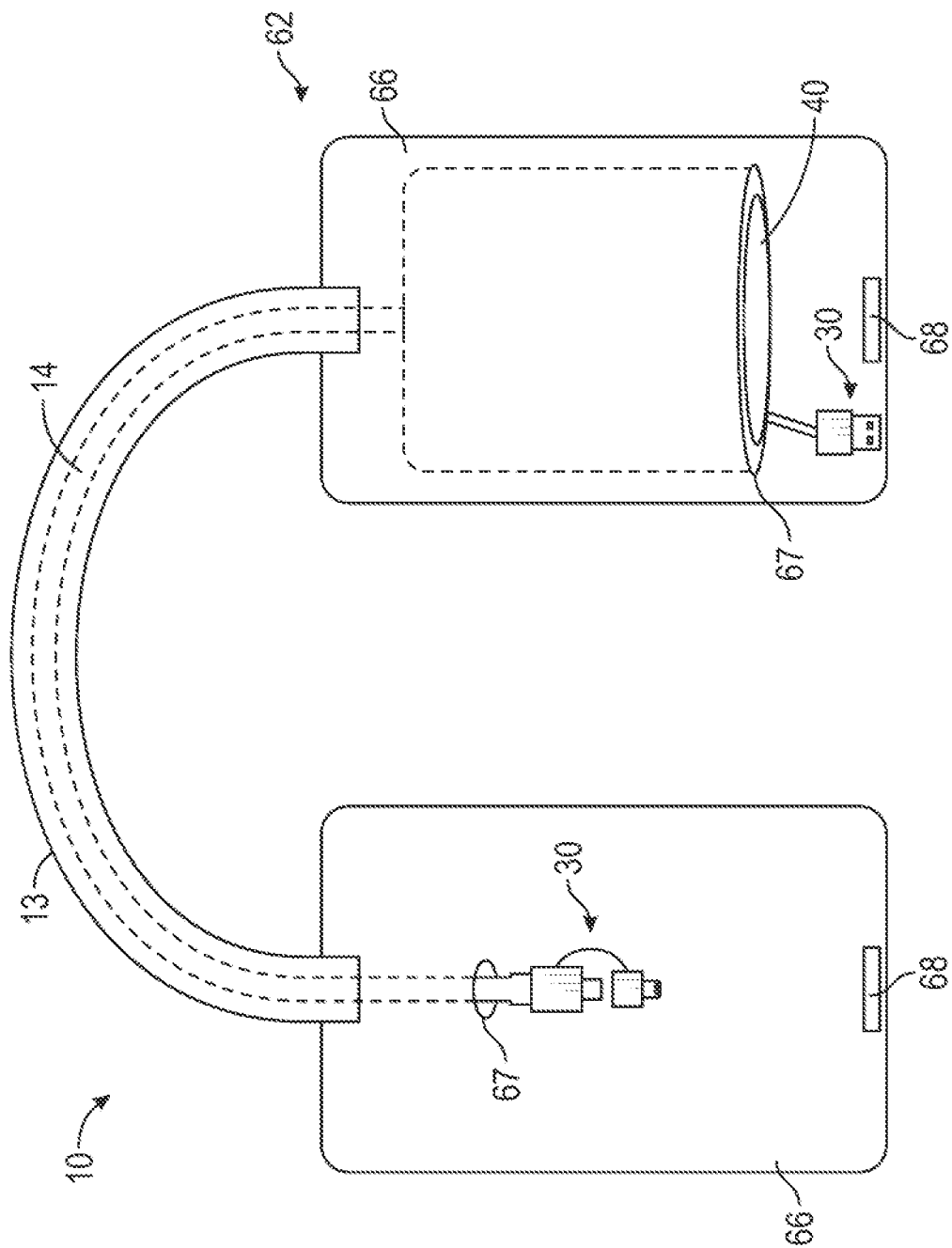
FIG. 9 shows a power charger and cable apparatus combined with a luggage tag according to another embodiment of the present invention.

FIG. 9 illustrates an embodiment of the power charger and cable apparatus 10, in which the luggage tag 62 comprises two faces 66 connected by a decorative sleeve 17 housing the charger cable 14. Each face 66 has an electrical fitting 30 extending through an opening 67 within each face 66 and the faces 66 can press against each other by a snap, magnet or zipper 68, enclosing the electrical fittings 30. Either opening 67 may be sized to allow the flashlight portion 40 to extend out of the luggage tag face 66 for use when the faces are separated.

Figure 10:
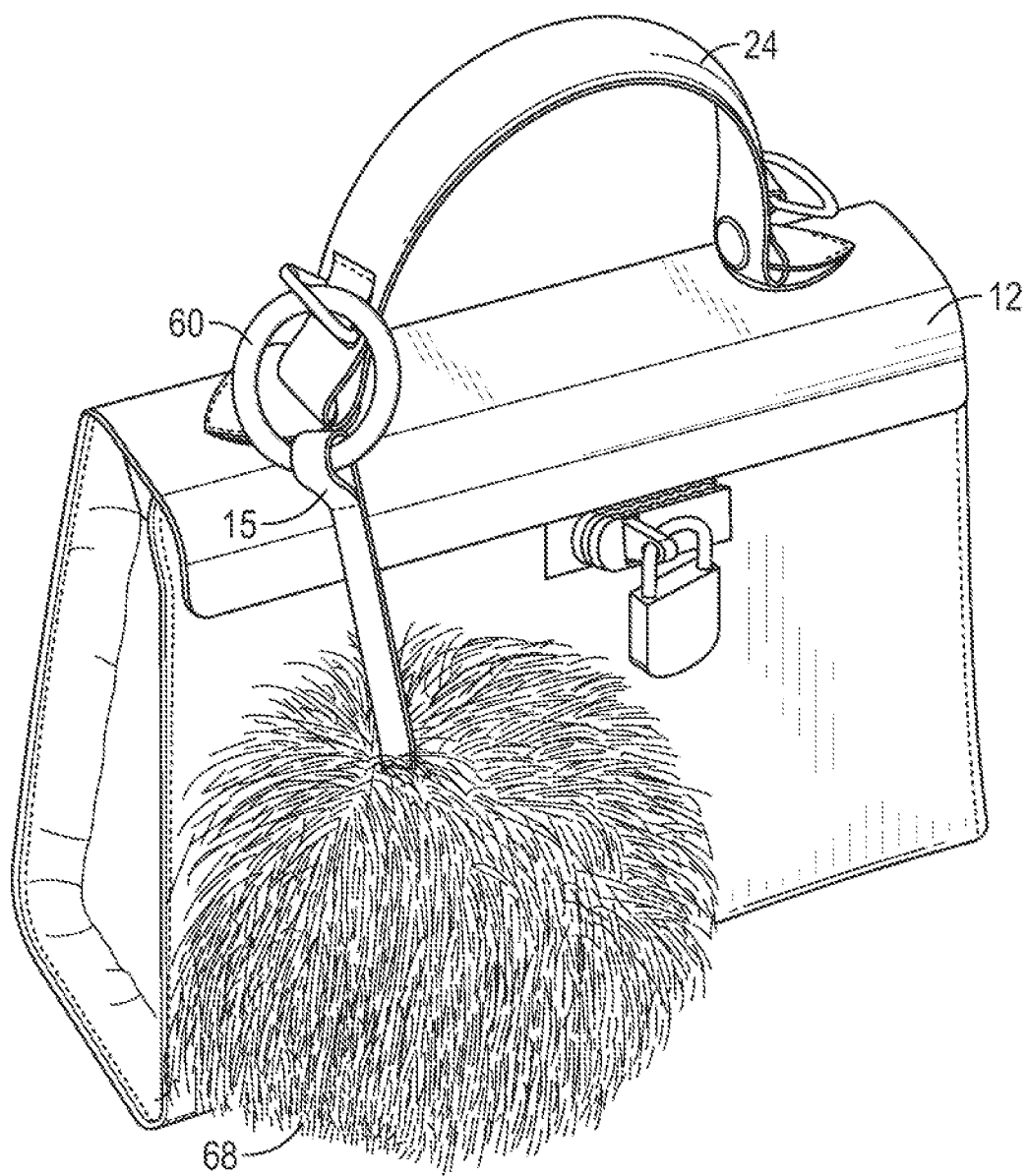
FIG. 10 shows a puffball combined with the power charger and cable apparatus according to another embodiment of the present invention.

FIG. 10 illustrates an embodiment of the power charger and cable apparatus 10, in which a puffball 72 is attached to a cable looped within the puffball 72 or a connector strap 15, as shown. The puffball 72 can conceal the charger housing 34, charger cable portions 28, and electrical fittings 30. Similar to FIGS. 6 and 7, the puffball 72 is looped through the carabineer 60 by way of the connector strap 15, and can be hooked on to the handle 24 of the fashion accessory 12 via the carabineer 60. The charger cable portions 28 can be adapted to retract into and extend from the charger housing 34 to extend one end of the electrical fittings 30 further out from the puffball 72 in order to facilitate connection with an electronic device, power source, or both. The puffball 72 may additionally include the caps 20 and slide tubes 48 described with regards to the embodiments of FIGS. 1 and 3-6. A power charger and cable apparatus 10 utilizing two puffballs 72 in addition to or as an alternative to the tassels 22 (described in FIGS. 1-5) is also contemplated by the present invention.

Figure 11:
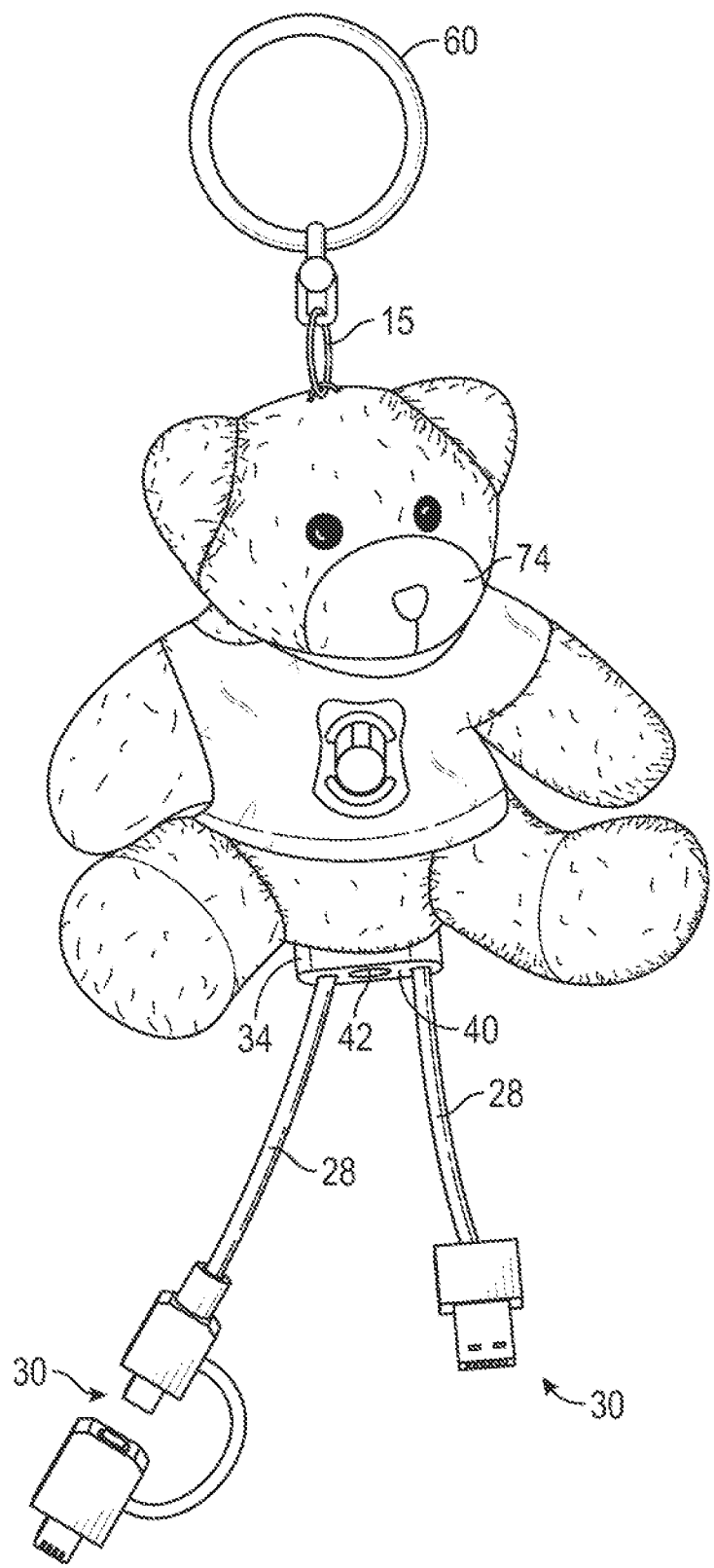
FIG. 11 shows a teddy bear combined with the power charger and cable apparatus according to another embodiment of the present invention.

FIG. 11 illustrates an embodiment of the power charger and cable apparatus 10 of the present invention in which a doll or figure, such as the illustrated teddy bear 74, is attached to and can conceal the charger housing 34 with the charger cable portions 28 and electrical fittings 30 being retractably biased toward the teddy bear and extendable away from the teddy bear 70. The teddy bear 70 is positioned on the charger housing 34 to hide the majority of the charger housing 34 but not obstruct a flashlight feature 40 (comprising LED 42) at the end of the charger housing 34.

The foregoing description of embodiments of the present invention has been presented for the purpose of illustration and description. It is not intended to exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A portable power charger and cable apparatus comprising:
   a power charger comprising:
      a charger housing; and
      a rechargeable battery internally disposed within the charger housing;
   a charging cable assembly attached to the charger housing and in operative communication with the rechargeable battery, said charging cable assembly having a first cable portion with a first electrical fitting and a second cable portion with a second electrical fitting, each cable portion projecting away from the charger housing; and
   a tasseled fitting attached to and surrounding at least the charger housing.

2. The portable power charger and cable apparatus according to claim 1, wherein the tasseled fitting comprises a central hub portion connected to the charger housing and a plurality of flexible strands loosely hanging from said central hub portion.

3. The portable power charger and cable apparatus according to claim 1 wherein one of the first and second electrical fittings is a squid fitting that provides more than one type of power connection interface.

4. A portable power charger and cable apparatus comprising:
   a charger unit having a charger housing defining a proximal and distal end, and a rechargeable battery internally disposed within the charger housing;
   a connector extending from the proximal end of the charger housing for connecting the charger unit to a fashion accessory by way of an attachment means;
   a cable extending from the distal end of the charger housing and in operative communication with the rechargeable battery, said cable having a power connection interface on the end thereof; and
   a tasseled fitting attached to the charger unit and surrounding at least a portion of the cable, and from which the power connection interface can project.

5. The portable power charger and cable apparatus according to claim 4, wherein the tasseled fitting comprises a central hub portion connected to the charger housing and a plurality of flexible strands loosely hanging from said central hub portion.

6. The portable power charger and cable apparatus according to claim 4, wherein the cable can be pulled outwardly from the charger housing for use and retracted towards the charger housing when not in use thereafter.

7. The portable power charger and cable apparatus according to claim 4, further comprising a second cable extending from the proximal end of the charger housing and in operative communication with the rechargeable battery, said second cable having a second power connection interface on the end thereof.

8. The portable power charger and cable apparatus according to claim 7, wherein each of the cables can be pulled outwardly from the charger housing for use and retracted towards the charger housing when not in use thereafter.

9. A portable power charger comprising:
   a power charger comprising:
      a charger housing; and
      a rechargeable battery internally disposed within the charger housing;
   a charging cable attached to the charger housing and in operative communication with the rechargeable battery, said charging cable projecting away from the charger housing and having a power connection interface on the end thereof; and
   an aesthetic element attached to the charger housing and comprising a tassel having a central hub portion connected to the charger housing and a plurality of flexible strands loosely hanging from said central hub portion,
   wherein the tassel is movable between a concealing condition, in which said tassel covers the power connection interface of the charging cable, and a revealing condition in which said tassel does not cover the power connection interface.

10. The portable power charger according to claim 9, wherein the plurality of flexible strands surround a least a portion of the charging cable to conceal said portion.

11. The portable power charger according to claim 9, wherein said tassel is movable between the concealing condition and the revealing condition by sliding the tassel relative to the power connection interface.

12. The portable power charger according to claim 9, wherein the charging cable is a squid cable that provides more than one type of power connection interface.

13. A portable power charger comprising:
   a power charger comprising:
      a charger housing; and
      a rechargeable battery internally disposed within the charger housing;
   a charging cable assembly attached to the charger housing and in operative communication with the rechargeable battery, said charging cable assembly having a first cable portion with a first electrical fitting and a second cable portion with a second electrical fitting, each cable portion projecting away from the charger housing;
   an aesthetic element attached to the charger housing and comprising a tassel having a central hub portion connected to the charger housing and a plurality of flexible strands loosely hanging from said central hub portion,
   wherein the plurality of flexible strands of the tassel surround the first cable portion and the second cable portion to conceal the first electrical fitting and the second electrical fitting.

14. The portable power charger according to claim 13, wherein at least one of the first cable portion and the second cable portion can be pulled outwardly from the charger housing for use and retracted towards the charger housing when not in use thereafter.

* * * * *